UNITED STATES PATENT OFFICE.

HARRY H. PIERCE, OF TOLEDO, OHIO, ASSIGNOR OF ONE-HALF TO ALLEN C. BRANTINGHAM, OF SAME PLACE.

TREATMENT OF LIME.

SPECIFICATION forming part of Letters Patent No. 622,388, dated April 4, 1899.

Application filed April 9, 1898. Serial No. 677,000. (No specimens.)

*To all whom it may concern:*

Be it known that I, HARRY H. PIERCE, a citizen of the United States, residing at Toledo, Lucas county, Ohio, have invented a certain new and useful Process for the Treatment of Lime and the Product of Such Process, of which the following is a specification.

The familiar objections and difficulties encountered in the storage, transportation, and use of common quicklime are its tendency to slake, heat, swell, and shrink, these changes frequently occurring after the lime is mixed and used with plaster and mortar, causing walls and ceilings to crack and chip off. Lime mortars usually require the action of air and the absorption therefrom of carbonic-acid gas to render the work sufficiently hard. This process is an extremely slow and tedious one, the lapse of many years being sometimes necessary to permit this atmospheric action to form a carbonate of the whole mass, and thus bring about the desired hardness of the mortar, except at or near the surface.

My invention relates to and its object is to provide means for overcoming the objections here pointed out, and more particularly to provide a process by which the lime in its preparation for use is artificially highly carbonized, thus causing mortars and plasters in which such lime is used to harden more rapidly and uniformly than heretofore.

In United States Letters Patent No. 599,792, granted to me March 1, 1898, I pointed out the advantages and claimed the process of treating lime, which consists in first slaking quicklime to a putty; second, roasting the hydrate of lime thus formed in the presence of carbonic-acid gas, and, third, grinding to a powder the product thus obtained. The process there described was found to prevent the slaking, heating, and swelling of lime when stored or in transit or when mixed with mortars and plasters and to bring about the uniform and rapid hardening of the mortar or plaster when in place. In practicing the process of that patent common quicklime-putty is fed into one end of a revolving iron cylinder and caused to travel slowly to the opposite end of the cylinder, where it is discharged in a roasted condition and thence conveyed to the grinding and bolting machinery. The revolving iron cylinder is heated by burning coke or the like. The carbonic-acid gases of the burned coke on their way to the smoke-stack pass through the cylinder in which the hydrated lime is agitated and are largely absorbed, and thus the lime is carbonated. In this process it is found in practice that the amount of carbonic-acid gas evolved by the combustion of different fuels varies and that the length of time for which lime must be exposed to the gases in the drier will depend largely upon the amount of moisture present in the putty. For these reasons it is very difficult by the process referred to to obtain a product of uniform carbonization.

My present invention is designed as an improvement upon the process of the patent referred to and to provide a process and a compound in which the carbonization of the lime may be accomplished with ease and great uniformity.

In practicing my invention common quicklime is first slaked to a putty. While the lime is slaking, preferably after it has been reduced to a putty, I mix with the lime pulverized or powdered carbonate of lime. This carbonate may be either marble-dust, chalk, uncalcined limestone, or any other form of pulverized natural lime carbonate. After the lime is thoroughly slaked and the admixture of the powdered carbonate is complete I roast the mixture to drive off the excess of moisture and to combine and diffuse the carbonic-acid gas of the carbonates with the lime. The hard irregular masses thus obtained are now, as a final step, reduced to a powder. In practice it is found that about twenty-five per cent., by weight, of carbonate will produce good results. The proportion of ground carbonate will of course vary according to the amount of carbonic acid present in the different carbonates employed. The proper proportions having been once ascertained renders it easy to retain the exact proportions desired and to obtain uniform results by weighing both the lime and the carbonate. The degree of heat and time of exposure will vary according to the condition of the putty and the amount of moisture present. The heat should be sufficient to drive off the uncombined moisture; but care should be taken not to subject the lime under treatment to a red heat or to such heat as will oxidize or recalcine the lime.

In carrying out my process any suitable apparatus may be employed for roasting the mixed putty, such as a series of shallow pans placed in an oven of proper temperature. If preferred, a rotary drier consisting of a revolving heated iron cylinder may be used, the putty being fed into one end of the cylinder and traveling slowly to the opposite end of the cylinder, where it is discharged and then conveyed to the grinding and bolting machinery. In either case care should be exercised to exclude from the compound the smoke and gases of the fire used in connection with the drier, so as to prevent discoloration of the lime as well as to avoid its excessive carbonization. After the mass has been roasted to such a degree as to drive off the uncombined moisture the mixture is ground and, if extreme fineness is required, bolted, and the product is now ready for use. The substance thus produced may be kept indefinitely without air-slaking, will not slake, heat or change, retains its setting qualities, is always ready for use, and may be applied to any of the purposes for which lime is commonly used, and especially in plasters and mortars. Plasters and mortars in which this lime is used become hard throughout in a short time and may be prepared with definite uniformity, owing to the ease with which the proportions of the ingredients and the degree of carbonization are controlled.

What I claim, and desire to secure by Letters Patent, is—

1. The herein-described process of treating lime which consists in, first, slaking quicklime to a putty; second, mixing with said putty natural carbonate of lime in a pulverized state; third, roasting the compound thus formed to drive off the uncombined moisture, and to combine and diffuse the carbonic-acid gas of the carbonate with the lime and fourth, grinding to a powder the product thus obtained, substantially as and for the purpose specified.

2. As an article of manufacture, a compound which consists of lime which, as quicklime, has been slaked to a putty, and then mixed with a pulverized natural carbonate, then roasted, to drive off the uncombined moisture and to combine and diffuse the carbonic-acid gas of the carbonate with the lime and then pulverized, substantially as and for the purpose specified.

HARRY H. PIERCE.

In presence of—
ALMON HALL,
L. E. BROWN.